(12) United States Patent
Sui et al.

(10) Patent No.: US 9,003,894 B2
(45) Date of Patent: Apr. 14, 2015

(54) ULTRASONIC FLOW MEASUREMENT SYSTEM

(75) Inventors: Lei Sui, Andover, MA (US); Toan Huu Nguyen, Needham, MA (US); Evan Lawrence Ross, Greenville, SC (US); Alexander Michael Zorn, Cicero, NY (US)

(73) Assignee: General Electric Company, Schenectady, NY (US)

( * ) Notice: Subject to any disclaimer, the term of this patent is extended or adjusted under 35 U.S.C. 154(b) by 353 days.

(21) Appl. No.: 13/455,830

(22) Filed: Apr. 25, 2012

(65) Prior Publication Data

US 2013/0283927 A1    Oct. 31, 2013

(51) Int. Cl.
*G01F 1/20*    (2006.01)
*G01F 1/66*    (2006.01)

(52) U.S. Cl.
CPC ..................................... *G01F 1/662* (2013.01)

(58) Field of Classification Search
None
See application file for complete search history.

(56) References Cited

U.S. PATENT DOCUMENTS

| | | | | |
|---|---|---|---|---|
| 3,349,607 A | * | 10/1967 | Klindt | 73/600 |
| 3,477,278 A | | 11/1969 | Lynnworth | |
| 5,433,112 A | | 7/1995 | Piche | |
| 5,828,274 A | | 10/1998 | Jen | |
| 6,343,511 B1 | * | 2/2002 | Lynnworth et al. | 73/644 |
| 6,475,151 B2 | | 11/2002 | Koger et al. | |
| 6,776,762 B2 | | 8/2004 | Erikson et al. | |
| 7,063,666 B2 | | 6/2006 | Weng et al. | |
| 7,103,960 B2 | | 9/2006 | Aime | |
| 7,913,806 B2 | | 3/2011 | Pabon et al. | |
| 8,291,744 B2 | * | 10/2012 | Djordjevic et al. | 73/1.86 |
| 2005/0115324 A1 | * | 6/2005 | Stauffer | 73/617 |
| 2007/0131034 A1 | * | 6/2007 | Ehlert et al. | 73/617 |
| 2009/0016555 A1 | | 1/2009 | Lynnworth | |

FOREIGN PATENT DOCUMENTS

EP    2221615 A1    8/2010

OTHER PUBLICATIONS

Search Report and Written Opinion from corresponding EP Application No. 13165152, dated Jul. 24, 2013.

* cited by examiner

*Primary Examiner* — Harshad R Patel
(74) *Attorney, Agent, or Firm* — Hiscock & Barclay LLP

(57) ABSTRACT

An ultrasonic flow measurement system having a first ultrasonic sensor with a first ultrasonic buffer and a second ultrasonic sensor with a second ultrasonic buffer is disclosed. The first and second ultrasonic buffers have different cross sections in order to reduce distortion of the ultrasonic signals.

11 Claims, 9 Drawing Sheets

ULTRASONIC FLOW MEASUREMENT SYSTEM

BACKGROUND OF THE INVENTION

The subject matter disclosed herein relates to an ultrasonic flow measurement system.

Flow meters, including ultrasonic flow sensors, are used to determine the characteristics (e.g., flow rate, pressure, temperature, etc.) of liquids, gases, etc. flowing in pipes of different sizes and shapes. Knowledge of these characteristics of the fluid can enable other physical properties or qualities of the fluid to be determined. For example, in some fluid custody-transfer applications, the flow rate of the fluid can be used to determine the volume of a fluid (e.g., oil or gas) being transferred from a seller to a buyer through a pipe over a period of time to determine the costs for the transaction/The volume is equal to the measured fluid flow rate multiplied by the cross sectional area of the pipe multiplied by the period of time over which the fluid flow is measured.

In one type of ultrasonic flow sensor employing transit time flow metering, one or more pairs of ultrasonic flow sensors can be installed along a portion of a pipe, referred to as a flow cell. Each pair of ultrasonic flow sensors contain an ultrasonic transducer and an ultrasonic buffer that are located upstream and downstream from each other, forming an ultrasonic path between these ultrasonic flow sensors at particular chordal locations across the pipe.

Each transducer, when energized, transmits an ultrasonic signal (e.g., a sound wave) along an ultrasonic path through the flowing fluid that is received by and detected by the other transducer. The path velocity of the fluid averaged along the ultrasonic path at a particular chordal location can be determined as a function of the differential between (1) the transit time of an ultrasonic signal traveling along the ultrasonic path from the downstream transducer upstream to the upstream transducer against the fluid flow direction, and (2) the transit time of an ultrasonic signal traveling along the ultrasonic path from the upstream transducer downstream to the downstream transducer with the fluid flow direction. Ultrasonic flow meters use signal processing techniques to identify the ultrasonic signals received by the transducers and the time that those ultrasonic signals were received in order to determine the transit times used to determine the flow rate of the fluid.

In some ultrasonic flow measurement systems (e.g., ultrasonic signals of a few megahertz or less where the wavelength of the ultrasonic signal is not significantly less than the diameter of the ultrasonic buffers), the spreading of the ultrasonic signal beam as it propagates within the ultrasonic buffer can result in distortion in the form of multiple ring-down signals and peaks in the received ultrasonic signal. This distortion is a result of angular portions of the ultrasonic signal reflecting off of the walls of the ultrasonic buffer. When these ring-down signals and peaks resulting from the distortion have amplitudes that are comparable or greater than the amplitudes of the main (non-angular) portion of the ultrasonic signal, the signal processing of the ultrasonic flow meter may not be able to accurately identify the main portion of the ultrasonic signal from which the transit time is determined.

The discussion above is merely provided for general background information and is not intended to be used as an aid in determining the scope of the claimed subject matter.

BRIEF DESCRIPTION OF THE INVENTION

An ultrasonic flow measurement system having a first ultrasonic sensor with a first ultrasonic buffer and a second ultrasonic sensor with a second ultrasonic buffer is disclosed. The first and second ultrasonic buffers have different cross sections in order to reduce distortion of the ultrasonic signals. An advantage that may be realized by the practice of some of the disclosed embodiments of the ultrasonic flow measurement system is improving the accuracy of the measured transit times.

In one embodiment, an ultrasonic flow measurement system is disclosed. The system comprises a first ultrasonic sensor comprising a first ultrasonic transducer and a first ultrasonic buffer, and a second ultrasonic sensor comprising a second ultrasonic transducer and a second ultrasonic buffer, the second ultrasonic sensor is aligned with the first ultrasonic sensor along an axis, wherein the first ultrasonic buffer has a first cross section that is perpendicular to the axis and the second ultrasonic buffer has a second cross section that is perpendicular to the axis, and wherein the first cross section of the first ultrasonic buffer is different from the second cross section of the second ultrasonic buffer.

In another embodiment, the ultrasonic flow measurement system comprises a first ultrasonic sensor comprising a first ultrasonic transducer and a first ultrasonic buffer, and a second ultrasonic sensor comprising a second ultrasonic transducer and a second ultrasonic buffer, the second ultrasonic sensor is aligned with the first ultrasonic sensor along an axis, wherein the first ultrasonic buffer has a first cross section that is perpendicular to the axis and the second ultrasonic buffer has a second cross section that is perpendicular to the axis, and wherein the first cross section of the first ultrasonic buffer has a first shape and the second cross section of the second ultrasonic buffer has a second shape, and wherein the first shape is different from the second shape.

In yet another embodiment, the ultrasonic flow measurement system comprises a first ultrasonic sensor comprising a first ultrasonic transducer and a first ultrasonic buffer, and a second ultrasonic sensor comprising a second ultrasonic transducer and a second ultrasonic buffer, the second ultrasonic sensor is aligned with the first ultrasonic sensor along an axis, wherein the first ultrasonic buffer has a first cross section that is perpendicular to the axis and the second ultrasonic buffer has a second cross section that is perpendicular to the axis, and wherein the first cross section of the first ultrasonic buffer has a first diameter and the second cross section of the second ultrasonic buffer has a second diameter, and wherein the first diameter is different from the second diameter.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
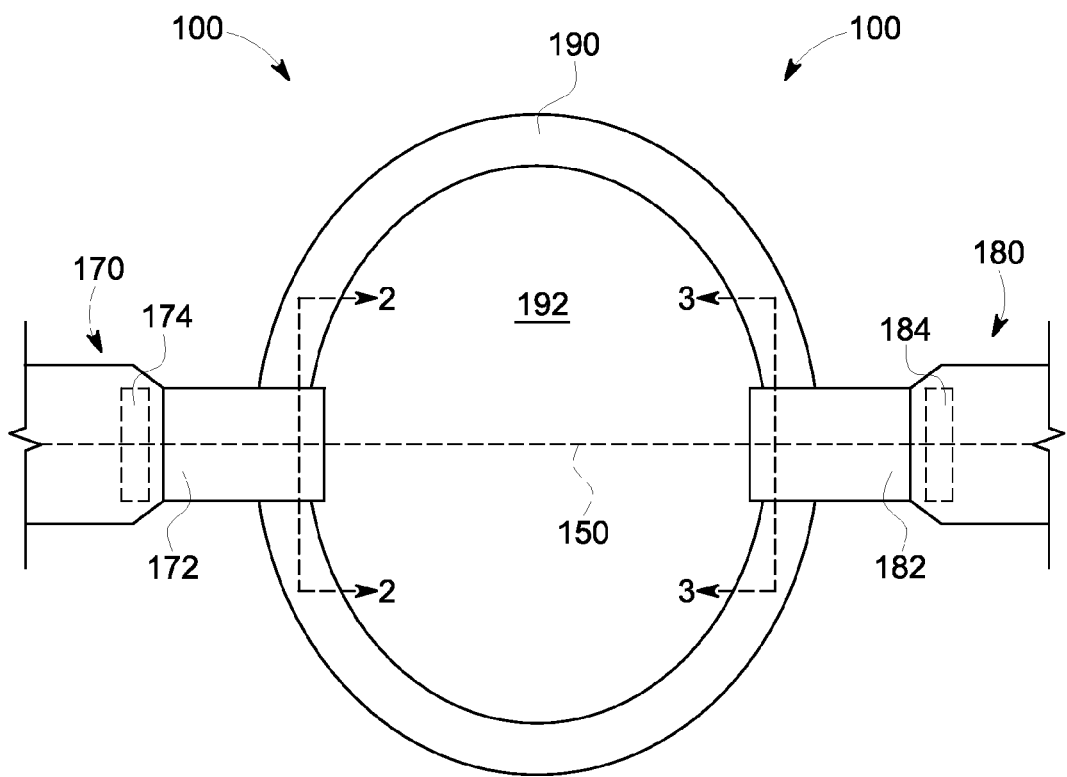
FIG. 1 is a diagram of an exemplary ultrasonic flow measurement system.

FIG. 1 is a diagram of an exemplary ultrasonic flow measurement system 100. As shown, this system 100 includes a first ultrasonic flow sensor 170 and a second ultrasonic flow sensor 180. The first ultrasonic flow sensor 170 includes a first ultrasonic buffer 172 and a first transducer 174. The second ultrasonic flow sensor 180 includes a second ultrasonic buffer 182 and a second transducer 184. Each ultrasonic flow sensor 170, 180 is designed to transmit and receive ultrasonic signals. The pipe 190 is designed to transport a fluid 192 that is in a liquid state, a gas state, or a combination of liquid and gas. The first and second ultrasonic flow sensors 170, 180 are each installed into the pipe 190 and each have ultrasonic buffers 172, 182 aligned along a common axis 150. The common axis 150 can be at an angle which is perpendicular to the axis of the pipe 190 where no flow is detected or at an angle other than ninety degrees with respect to the axis of the pipe 190 to detect flow.

Figure 2:
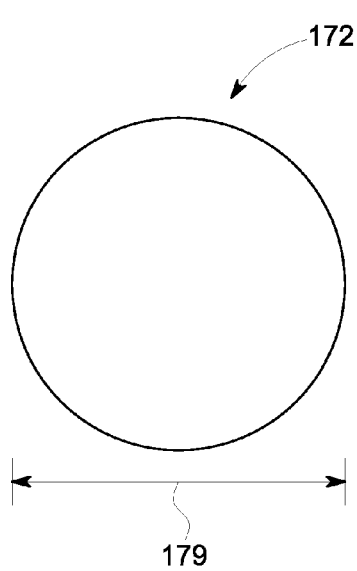
FIG. 2 illustrates a cross sectional view of the exemplary first ultrasonic buffer of FIG. 1.
Figure 3:
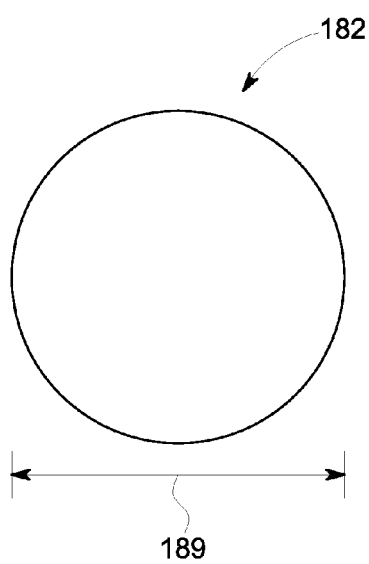
FIG. 3 illustrates a cross sectional view of the exemplary second ultrasonic buffer of FIG. 1.

FIG. 2 illustrates a cross sectional view of the exemplary first ultrasonic buffer 172, while FIG. 3 illustrates a cross sectional view of the exemplary second ultrasonic buffer 182 of FIG. 1. As shown in these figures, the first ultrasonic buffer 172 has a cross section (i.e., circular in shape) with a first diameter 179, while the second ultrasonic buffer 182 has a cross section (i.e., circular in shape) with a second diameter 189. Both cross sections and other cross sections described within this document are defined along a plane that is perpendicular to the axis 150 (FIG. 1). Comparing FIGS. 2 and 3 shows that the cross section of the first ultrasonic buffer 172 is the same shape and size as the cross section of the second ultrasonic buffer 182. In one embodiment, the diameters 179, 189 are 0.5 inches (12.7 millimeters). As will be explained, since the cross section of the first ultrasonic buffer 172 is the same as the cross section of the second ultrasonic buffer 182, this symmetry will produce significant distortions (ring-down signals, peaks) in the received ultrasonic signal.

Figure 4:
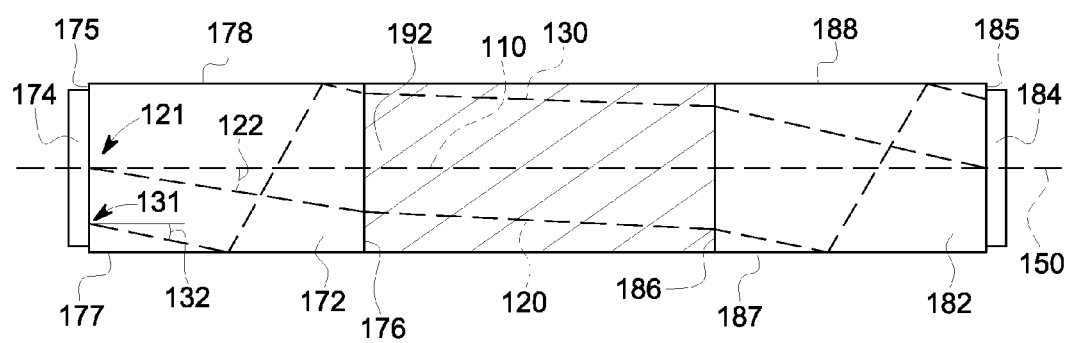
FIG. 4 illustrates a plurality of ultrasonic signal paths traveling from the first ultrasonic buffer to the second ultrasonic buffer of FIGS. 1-3.

FIG. 4 illustrates a plurality of ultrasonic signal paths 110, 120, 130 traveling from the first ultrasonic buffer 172 to the second ultrasonic buffer 182 of FIGS. 1-3. The ultrasonic signal is transmitted from the first transducer 174 via the first ultrasonic buffer 172 to the second ultrasonic flow sensor 180 via the second ultrasonic buffer 182. A portion of the ultrasonic signal is transmitted along a first (main) ultrasonic signal path 110, which is co-axial with axis 150 of FIG. 1. This first ultrasonic signal path 110 is a straight and direct path from the first ultrasonic buffer 172 to the second ultrasonic buffer 182. As a result of beam spread of the ultrasonic signal, angular components of the ultrasonic signal travel along many other ultrasonic signal paths in addition to the first ultrasonic signal path 110. For example, portions of the ultrasonic signal also travel along a second ultrasonic signal path 120 and a third ultrasonic signal path 130.

The second ultrasonic signal path 120 is initially directed at a 10 degree angle 122 from a center location 121 along the back wall 175 of the first ultrasonic buffer 172. This second ultrasonic signal path 120 changes direction at the face 176 of the first ultrasonic buffer 172, where it refracts into the fluid 192. The second ultrasonic signal path 120 changes direction at the face 186 of the second ultrasonic buffer 182 where it refracts from the fluid 192 into the second ultrasonic buffer 182. The second ultrasonic signal path 120 changes direction again when it reflects off the lower wall 187 of the second ultrasonic buffer 182. The second ultrasonic signal path 120 changes direction again when it reflects off the upper wall 188 of the second ultrasonic buffer 182. The second ultrasonic signal path 120 exits the second ultrasonic buffer 182 along the back wall 185 of the second ultrasonic buffer 182 and is received by the second ultrasonic transducer 184. As shown, the second ultrasonic signal path 120 is longer than the first ultrasonic signal path 110.

The third ultrasonic signal path 130 is initially directed at a 10 degree angle 132 from a non-center location 131 along the back wall 175 of the first ultrasonic buffer 172. The third ultrasonic signal path 130 changes direction when it reflects off the lower wall 177 of the first ultrasonic buffer 172. The third ultrasonic signal path 130 changes direction and reflects off an upper wall 178 of the first ultrasonic buffer 172. Next, the third ultrasonic signal path 130 changes direction at the face 176 of the first ultrasonic buffer 172, where it refracts into the fluid 192. The third ultrasonic signal path 130 changes direction at the face 186 of the second ultrasonic buffer 182 where it refracts from the fluid 192 into the second ultrasonic buffer 182. The third ultrasonic signal path 130 exits the second ultrasonic buffer 182 along the back wall 185 of the second ultrasonic buffer 182 and is received by the second ultrasonic transducer 184. As shown, the third ultrasonic signal path 130 is longer than the first ultrasonic signal path 110, but is the same length as the second ultrasonic signal path 120.

Figure 5:
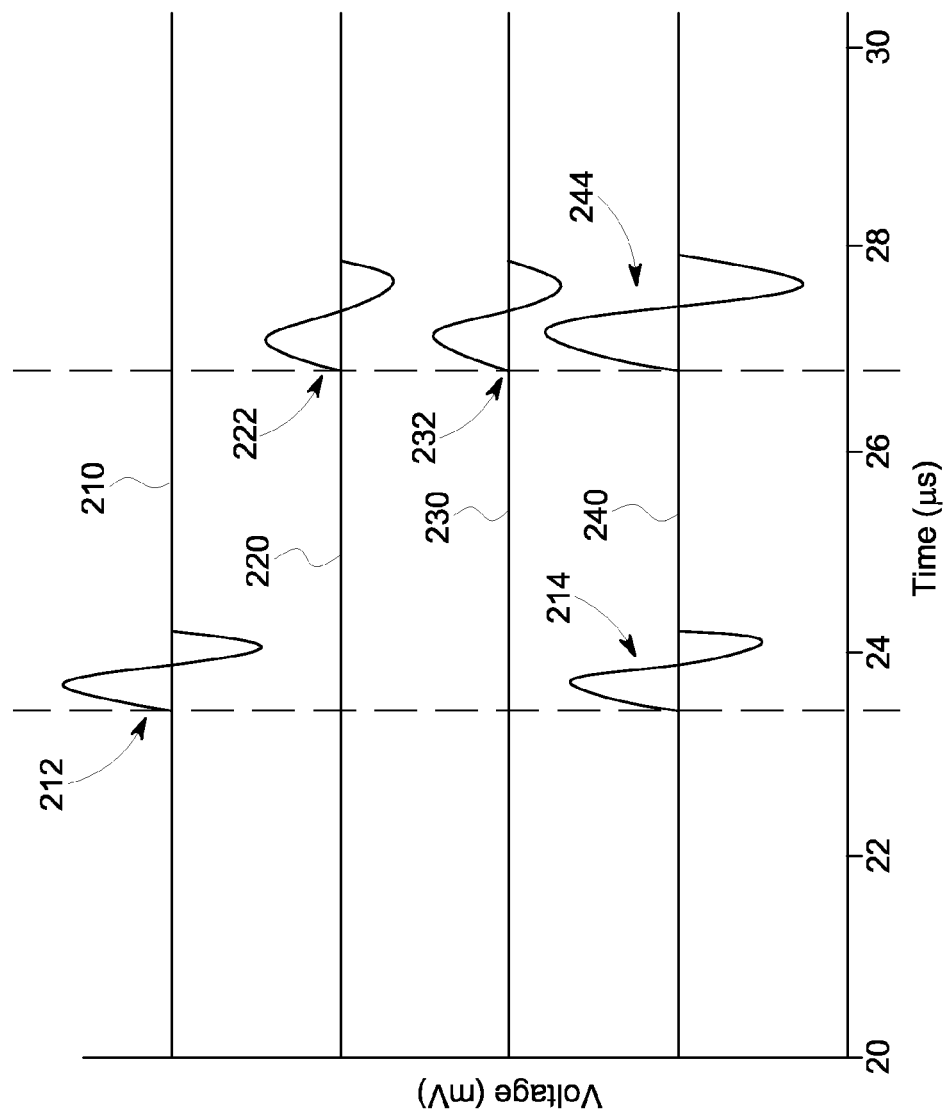
FIG. 5 illustrates a plurality of received ultrasonic signal waveforms corresponding to the ultrasonic signal as it is received by the second ultrasonic transducer via the ultrasonic signal paths of FIG. 4.

FIG. 5 illustrates a plurality of received ultrasonic signal waveforms 210, 220, 230 corresponding to the ultrasonic signal as it is received by the second ultrasonic transducer 184 via each of the ultrasonic signal paths 110, 120, 130 of FIG. 4. It should be noted that the graph of FIG. 5 (and all other graphs herein) show the ultrasonic signal waveforms on the same voltage (Y) axis to illustrate the relative amplitudes of each ultrasonic waveform. Each ultrasonic signal waveform 210, 220, 230 is a representative portion of the ultrasonic signal. As shown, the first ultrasonic signal waveform 210 is received via the first ultrasonic signal path 110, the second ultrasonic signal waveform 220 is received via the second ultrasonic signal path 120, and the third ultrasonic signal waveform 230 is received via the third ultrasonic signal path 130. The fourth (combined) ultrasonic signal waveform 240 is the ultrasonic signal waveform received from the combination of the ultrasonic signal paths 110, 120, 130.

Each of the ultrasonic signal waveforms 210, 220, 230 includes a leading edge 212, 222, 232, respectively, that arrives at a particular time. In one exemplary ultrasonic flow measurement system (1 MHz ultrasonic signal, the first and second ultrasonic buffers 172, 182 are made from SS316 stainless steel, each having a 0.50 in (12.70 mm) diameter by 0.75 in. (19.05 mm) length, with 1.0 in. (25.4 mm) water separation between the ultrasonic buffers 172, 182), the leading edge 212 of the first ultrasonic signal waveform 210 is received by the second ultrasonic transducer 184 via the first ultrasonic signal path 110 at a time of 23.53 microseconds. The leading edge 222 of the second ultrasonic signal waveform 220 is received via the second ultrasonic signal path 120 at a time of 27.11 microseconds. The leading edge 232 of the third ultrasonic signal waveform 230 is received via the third ultrasonic signal path 130 at a time of 27.11 microseconds, the same time as the leading edge 222 of the second ultrasonic signal waveform 220.

The first portion 214 of the combined ultrasonic signal waveform 240 is the portion of the received ultrasonic signal contributed by the first ultrasonic signal waveform 210 received via the first ultrasonic signal path 110 from which the transit time should be determined. But since the second and third ultrasonic signal waveforms 220, 230 arrive at the same time (27.11 microseconds), the constructive combination of these ultrasonic signal waveforms 220, 230 forms a second portion 244 of the combined ultrasonic signal waveform 240 that has a greater amplitude than the first portion 214 of the combined ultrasonic signal waveform 240. This second portion 244 of the combined waveform can produce unwanted ring-down signals and peaks in the combined ultrasonic signal waveform 240 that can result in the signal processing electronics of the ultrasonic flow measurement system being unable to accurately identify the first portion 214 of the combined ultrasonic waveform 240 from which the transit time of the ultrasonic signal is determined.

To address this problem, embodiments of the invention reduce the constructive combination of ultrasonic signal waveforms that are received from the angular ultrasonic signal paths so that the first (main) ultrasonic signal waveform of the first (main) ultrasonic signal path is more easily identifiable by the signal processing electronics. This reduction is accomplished using ultrasonic buffers having different cross sections to reduce the symmetry of the ultrasonic signal paths in the ultrasonic flow measurement system, creating different ultrasonic signal path lengths for the angular components of the ultrasonic signal.

Figure 6:
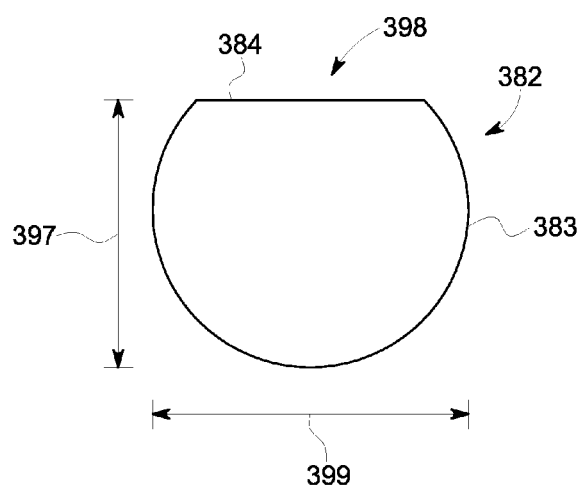
FIG. 6 illustrates a cross sectional view of an exemplary third ultrasonic buffer.

FIG. 6 illustrates a cross sectional view of an exemplary third ultrasonic buffer 382. Comparing FIG. 2 with FIG. 6 shows that the cross section of the first ultrasonic buffer 172 is different than the cross section of the third ultrasonic buffer 382. As shown, the third ultrasonic buffer 382 has a cross section having a first section 383 that has a circular shape and a second section 384 forming a straight line edge 398. This cross section is referred to herein as having a letter "D" shape. The "D" shape shown in FIG. 6 is different than the circular "O" cross section shape of first ultrasonic buffer 172 shown in FIG. 2. This "D" shape cross section has a first dimension 397 and a second dimension 399. In one embodiment, the first dimension 397 is 0.427 inches (10.85 millimeters) and the second dimension 399 is 0.5 inches (12.7 millimeters).

Figure 7:
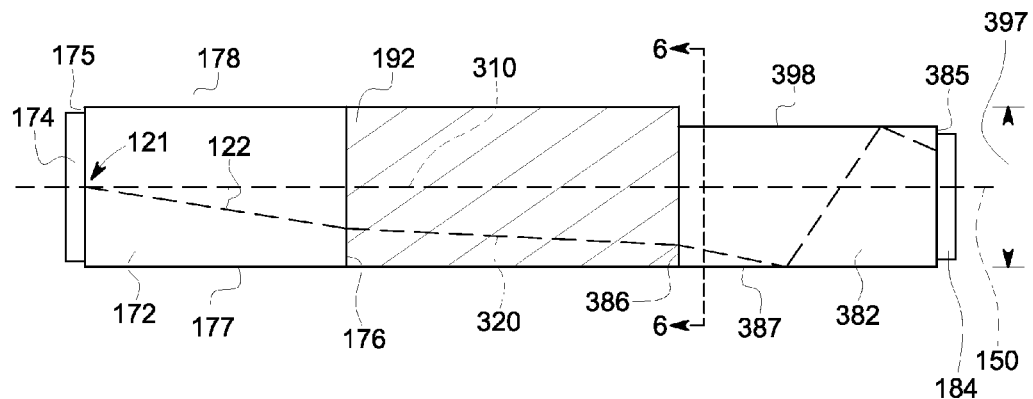
FIG. 7 illustrates a plurality of signal paths traveling from the first ultrasonic buffer to the third ultrasonic buffer.

FIG. 7 illustrates a plurality of ultrasonic signal paths 310, 320 traveling from the first ultrasonic buffer 172 (FIG. 2) to the third ultrasonic buffer 382 of FIG. 6, as seen from a first perspective. The third ultrasonic buffer 382 is shown where the first dimension 397 is the distance between the lower wall 387 and the straight line edge 398, which constitutes an upper wall of the third ultrasonic buffer 382. The ultrasonic signal is transmitted from the first transducer 174 via the first ultrasonic buffer 172 to the second transducer 184 via the third ultrasonic buffer 382. A portion of the ultrasonic signal is transmitted along a first (main) ultrasonic signal path 310, which is co-axial with axis 150 of FIG. 1. This first ultrasonic signal path 310 is a straight and direct path from the first ultrasonic buffer 172 to the third ultrasonic buffer 382. As a result of beam spread of the ultrasonic signal, angular components of the ultrasonic signal travel along many other ultrasonic signal paths in addition to the first ultrasonic signal path 310. For example, portions of the ultrasonic signal also travel along a second ultrasonic signal path 320 (FIG. 7) and a third ultrasonic signal path 330 (FIG. 8).

The second ultrasonic signal path 320 is initially directed at a 10 degree angle 122 from a center location 121 along the back wall 175 of the first ultrasonic buffer 172. This second ultrasonic signal path 320 changes direction at the face 176 of the first ultrasonic buffer 172, where it refracts into the fluid 192. This second ultrasonic signal path 320 changes direction at the face 386 of the third ultrasonic buffer 382 where it refracts from the fluid 192 into the third ultrasonic buffer 382. The second ultrasonic signal path 320 changes direction again when it reflects off the lower wall 387 of the third ultrasonic buffer 382. The second ultrasonic signal path 320 changes direction again when it reflects off the straight line edge 398 or upper wall of the third ultrasonic buffer 382. The second ultrasonic signal path 320 exits the second ultrasonic buffer 382 along the back wall 385 of the third ultrasonic buffer 382 and is received by the second ultrasonic transducer 184. As shown, the second ultrasonic signal path 320 is longer than the first ultrasonic signal path 310.

Figure 8:
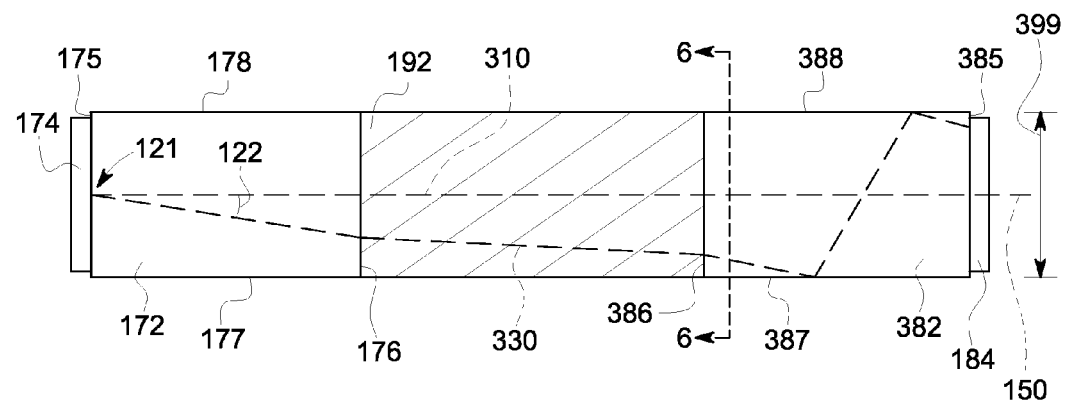
FIG. 8 illustrates a plurality of signal paths traveling from the first ultrasonic buffer to the third ultrasonic buffer.

FIG. 8 illustrates a plurality of ultrasonic signal paths 310, 330 traveling from the first ultrasonic buffer 172 (FIG. 2) to the third ultrasonic buffer 382 of FIG. 6, as seen from a second perspective. The third ultrasonic buffer 382 is shown where the second dimension 399 is the distance between the lower wall 387 and the upper wall 388 of the third ultrasonic buffer 382. Relative to FIG. 7, the third ultrasonic buffer 382 has been rotated 90 degrees.

The third ultrasonic signal path 330 is initially directed at a 10 degree angle 122 from a center location 121 along the back wall 175 of the first ultrasonic buffer 172. This third ultrasonic signal path 330 changes direction at the face 176 of the first ultrasonic buffer 172, where it refracts into the fluid 192. This third ultrasonic signal path 330 changes direction at the face 386 of the third ultrasonic buffer 382 where it refracts from the fluid 192 into the third ultrasonic buffer 382. The third ultrasonic signal path 330 changes direction again when it reflects off the lower wall 387 of the third ultrasonic buffer 382. The third ultrasonic signal path 330 changes direction again when it reflects off the or upper wall 388 of the third ultrasonic buffer 382. The third ultrasonic signal path 330 exits the third ultrasonic buffer 382 along the back wall 385 of the third ultrasonic buffer 382 and is received by the second ultrasonic transducer 184. As shown, the third ultrasonic signal path 330 is longer than the first ultrasonic signal path 310, and is slightly longer than the second ultrasonic signal path 320.

Figure 9:
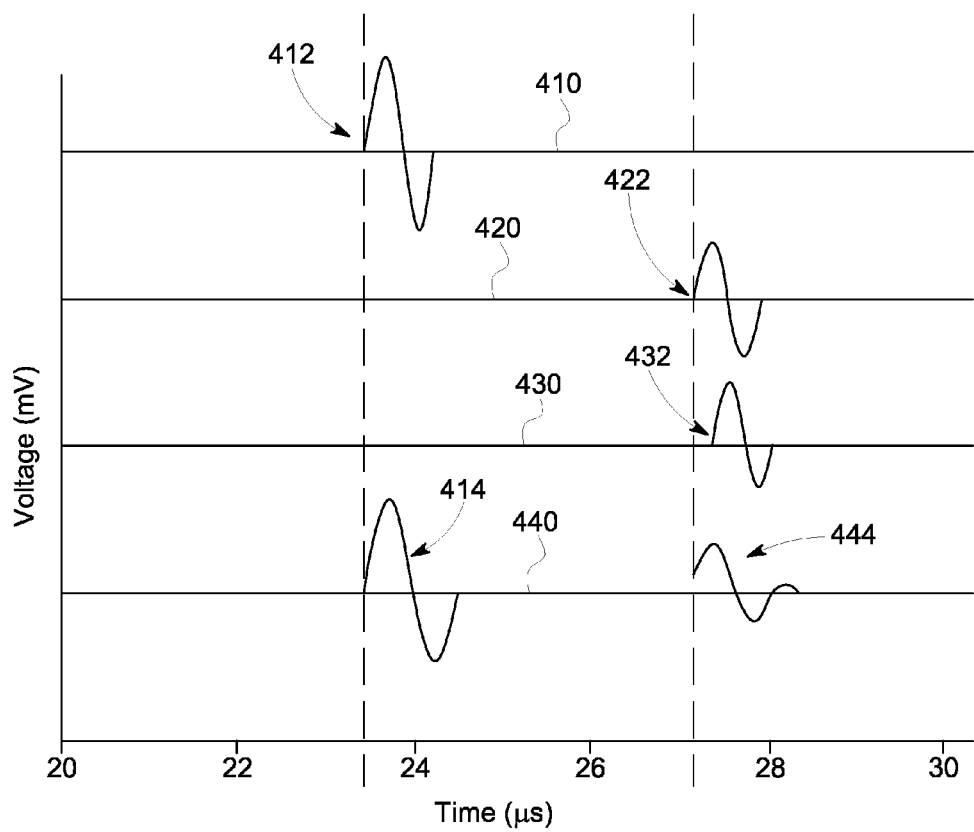
FIG. 9 illustrates a plurality of received ultrasonic signal waveforms corresponding to the ultrasonic signal as it is received by the second ultrasonic transducer via the ultrasonic signal paths of FIGS. 7-8.

FIG. 9 illustrates a plurality of received ultrasonic signal waveforms 410, 420, 430 corresponding to the ultrasonic signal as it is received by the second ultrasonic transducer 184 via each of the ultrasonic signal paths 310, 320, 330 of FIGS. 7-8. Each ultrasonic signal waveform 410, 420, 430 is a representative portion of the ultrasonic signal. As shown, the first ultrasonic signal waveform 410 is received via the first ultrasonic signal path 310, the second ultrasonic signal waveform 420 is received via the second ultrasonic signal path 320, and the third ultrasonic signal waveform 430 is received via the third ultrasonic signal path 330. The fourth (combined) ultrasonic signal waveform 440 is the combination of the ultrasonic signal paths 310, 320, 330.

Each of the ultrasonic signal waveforms 410, 420, 430, respectively includes a leading edge 412, 422, 432 that arrives at a particular time. In one exemplary ultrasonic flow measurement system (1 MHz ultrasonic signal, the first ultrasonic buffer 172 and the third ultrasonic buffer 382 are made from SS316 stainless steel, each 0.75 in. (19.05 mm) length, with 1.0 in. (25.4 mm) water separation between the ultrasonic buffers 172, 382), the leading edge 412 of the first ultrasonic signal waveform 410 is received by the second ultrasonic transducer 184 via the first ultrasonic signal path 310 at a time of 23.53 microseconds. The leading edge 422 of the second ultrasonic signal waveform 420 is received via the second ultrasonic signal path 320 at a time of 27.12 microseconds. The leading edge 432 of the third ultrasonic signal waveform 430 is received via the third ultrasonic signal path 330 at a time of 27.61 microseconds, different than the time of the leading edge 422 of the second ultrasonic signal waveform 420 because of the different cross-sections of the ultrasonic buffers 172, 382.

The first portion 414 of the combined ultrasonic signal waveform 440 is the portion of the received ultrasonic signal contributed by the first ultrasonic signal waveform 410 received via the first ultrasonic signal path 410 from which the transit time should be determined. Since the second and third ultrasonic signal waveforms 420, 430 arrive at different times that are approximately one half cycle/period apart (0.5 microseconds for a 1 MHz signal), the destructive combination of these ultrasonic signal waveforms 420, 430 forms a second portion 444 of the combined ultrasonic signal waveform 440 that has a smaller amplitude than the first portion 414 of the combined ultrasonic signal waveform 440. Since the amplitude of the second portion 444 is smaller than the amplitude of the first portion 414 of the combined ultrasonic signal waveform 440, the signal processing electronics of the ultrasonic flow measurement system can more easily identify the first portion 414 of the combined ultrasonic signal waveform 440 from which the transit time of the ultrasonic signal is determined.

Figure 10:
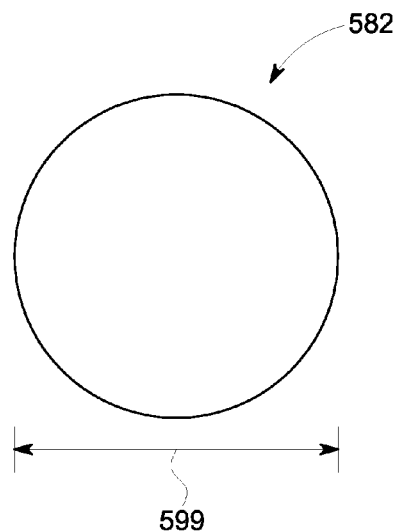
FIG. 10 illustrates a cross sectional view of an exemplary fourth ultrasonic buffer.

FIG. 10 illustrates a cross sectional view of an exemplary fourth ultrasonic buffer 582. Comparing FIG. 2 with FIG. 10 shows that the cross section of the first ultrasonic buffer 172 is different than the cross section of the fourth ultrasonic buffer 582. As shown, the fourth ultrasonic buffer 582 has a diameter 599 of 0.427 inches (10.5 millimeters), which is smaller than the diameter 179 of the first ultrasonic buffer 172, which is 0.5 inches (12.7 millimeters).

Figure 11:
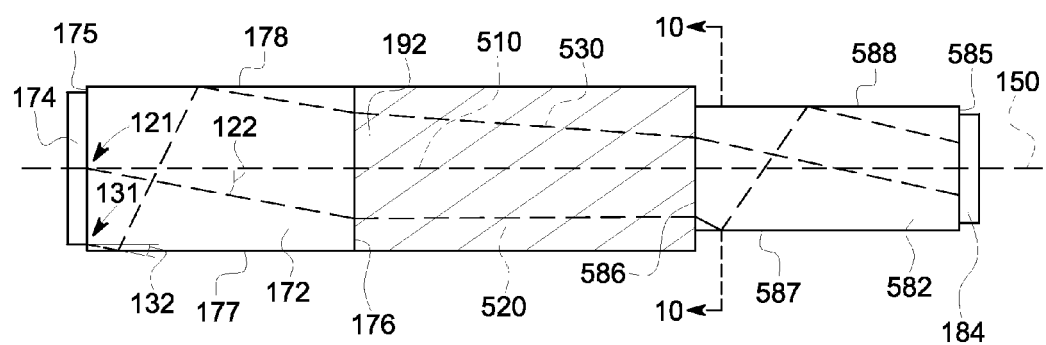
FIG. 11 illustrates a plurality of ultrasonic signal paths traveling from the first ultrasonic buffer to the fourth ultrasonic buffer.

FIG. 11 illustrates a plurality of ultrasonic signal paths 510, 520, 530 traveling from the first ultrasonic buffer 172 (FIG. 2) to the fourth ultrasonic buffer 582 of FIG. 10. The ultrasonic signal is transmitted from the first transducer 174 via the first ultrasonic buffer 172 to the second transducer 184 via the fourth ultrasonic buffer 582. A portion of the ultrasonic signal is transmitted along a first (main) ultrasonic signal path 510, which is co-axial with axis 150 of FIG. 1. This first ultrasonic signal path 510 is a straight and direct path from the first ultrasonic buffer 172 to the fourth ultrasonic buffer 582. As a result of beam spread of the ultrasonic signal, angular components of the ultrasonic signal travel along many other ultrasonic signal paths in addition to the first ultrasonic signal path 510. For example, a portion of the ultrasonic signal also travels along a second ultrasonic signal path 520 and a third ultrasonic signal path 530.

The second ultrasonic signal path 520 is initially directed at a 10 degree angle 122 from a center location 121 along the back wall 175 of the first ultrasonic buffer 172. This second ultrasonic signal path 520 changes direction at the face 176 of the first ultrasonic buffer 172, where it refracts into the fluid 192. This second ultrasonic signal path 520 changes direction at the face 586 of the fourth ultrasonic buffer 582 where it refracts from the fluid 192 into the fourth ultrasonic buffer 582. The second ultrasonic signal path 520 changes direction again when it reflects off the lower wall 587 of the fourth ultrasonic buffer 582. The second ultrasonic signal path 520 changes direction again when it reflects off the upper wall 588 of the third ultrasonic buffer 582. The second ultrasonic signal path 520 exits the fourth ultrasonic buffer 582 along the back wall 585 of the fourth ultrasonic buffer 582 and is received by the second ultrasonic transducer 184. As shown, the second ultrasonic signal path 520 is longer than the first ultrasonic signal path 510.

The third ultrasonic signal path 530 is initially directed at a 10 degree angle 132 from a non-center location 131 along the back wall 175 of the first ultrasonic buffer 172. The second ultrasonic signal path 530 changes direction when it reflects off the lower wall 177 of the first ultrasonic buffer 172. The third ultrasonic signal path 530 changes direction and reflects off an upper wall 178 of the first ultrasonic buffer 172. Next, the third ultrasonic signal path 530 changes direction at the face 176 of the first ultrasonic buffer 172, where it refracts into the fluid 192. The third ultrasonic signal path 530 changes direction at the face 586 of the fourth ultrasonic buffer 582 where it refracts from the fluid 192 into the fourth ultrasonic buffer 582. The third ultrasonic signal path 530 exits the fourth ultrasonic buffer 582 along the back wall 585 of the fourth ultrasonic buffer 582 and is received by the second ultrasonic transducer 184. As shown, the ultrasonic signal path 530 is longer than the first ultrasonic signal path 510, and is slightly longer than the second ultrasonic signal path 520.

Figure 12:
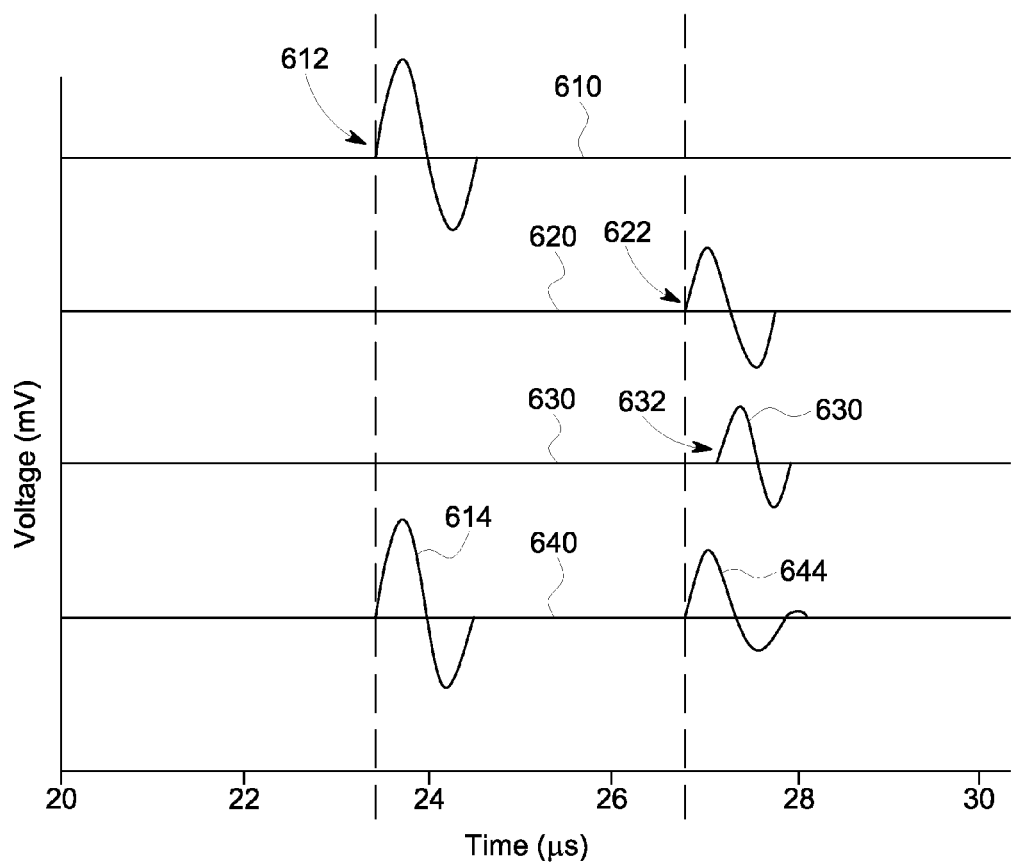
FIG. 12 illustrates a plurality of received ultrasonic signal waveforms corresponding to the ultrasonic signal as it is received by the second ultrasonic transducer via the ultrasonic signal paths of FIG. 11.

FIG. 12 illustrates a plurality of received ultrasonic signal waveforms 610, 620, 630 corresponding to the ultrasonic signal as it is received by the second ultrasonic transducer 184 via the ultrasonic signal paths 510, 520, 530 of FIG. 11. Each ultrasonic signal waveform 610, 620, 630 is a representative portion of the ultrasonic signal. As shown, the first ultrasonic signal waveform 610 is received via the first ultrasonic signal path 510, the second ultrasonic signal waveform 620 is received via the second ultrasonic signal path 520, and the third ultrasonic signal waveform 630 is received via the third ultrasonic signal path 530. The fourth (combined) ultrasonic signal waveform 640 is the combination of the ultrasonic signal paths 510, 520, 530.

Each of the ultrasonic signal waveforms 610, 620, 630, respectively includes a leading edge 612, 622, 632 that arrives at a particular time. In one exemplary ultrasonic flow measurement system (1 MHz ultrasonic signal, the first ultrasonic buffer 172 and the fourth ultrasonic buffer 582 are made from SS316 stainless steel, each 0.75 in. (19.05 mm) length, with 1.0 in. (25.4 mm) water separation between the ultrasonic buffers 172, 582), the leading edge 612 of the first ultrasonic signal waveform 610 is received by the second ultrasonic transducer 184 via the first ultrasonic signal path 510 at a time of 23.53 microseconds. The leading edge 622 of the second ultrasonic signal waveform 620 is received via the second ultrasonic signal path 520 at a time of 26.61 microseconds. The leading edge 632 of the third ultrasonic signal waveform 630 is received via the third ultrasonic signal path 530 at a time of 27.12 microseconds, different than the time of the leading edge 622 of the second ultrasonic signal waveform 620 because of the different cross-sections of the ultrasonic buffers 172, 582.

The first portion 614 of the combined ultrasonic signal waveform 640 is the portion of the received ultrasonic signal contributed by the first ultrasonic signal waveform 610 received via the first ultrasonic signal path 510 from which the transit time should be determined. Since the second and third ultrasonic signal waveforms 620, 630 arrive at different times that are approximately one half cycle/period apart (0.5 microseconds for a 1 MHz signal), the destructive combination of these ultrasonic signal waveforms 620, 630 forms a second portion 644 of the combined ultrasonic signal waveform 640 that has a smaller amplitude than the first portion 614 of the combined ultrasonic signal waveform 640. Since the amplitude of the second portion 644 is smaller than the amplitude of the first portion 614 of the combined ultrasonic signal waveform 640, the signal processing electronics of the ultrasonic flow measurement system can more easily identify the first portion 614 of the combined ultrasonic signal waveform 640 from which the transit time of the ultrasonic signal is determined.

Figure 13:
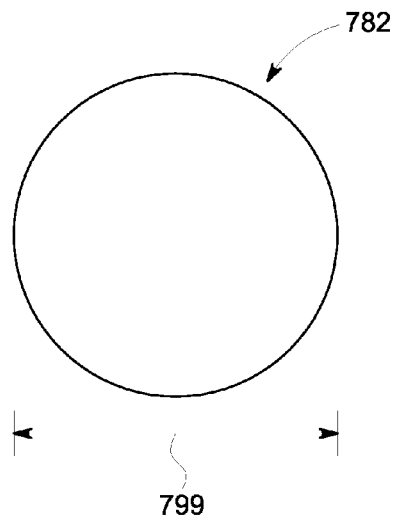
FIG. 13 illustrates a cross sectional view of an exemplary fifth ultrasonic buffer.

FIG. 13 illustrates a cross sectional view of an exemplary fifth ultrasonic buffer 782. Comparing FIG. 2 with FIG. 13 shows that the cross section of the first ultrasonic buffer 172 is slightly different than the cross section of the fifth ultrasonic buffer 782. As shown, the fifth ultrasonic buffer 782 has a diameter 799 of 0.51 inches (12.95 millimeters), which is slightly larger than the diameter 179 of the first ultrasonic buffer 172, which is 0.50 inches (12.7 millimeters). Further, in this embodiment, the first ultrasonic buffer 172 is here made from Molybdenum and the fifth ultrasonic buffer 782 is made from SS316 stainless steel. It will be understood that other materials can be used for the ultrasonic buffers, which may result in the use of different diameters for those buffers.

Figure 14:
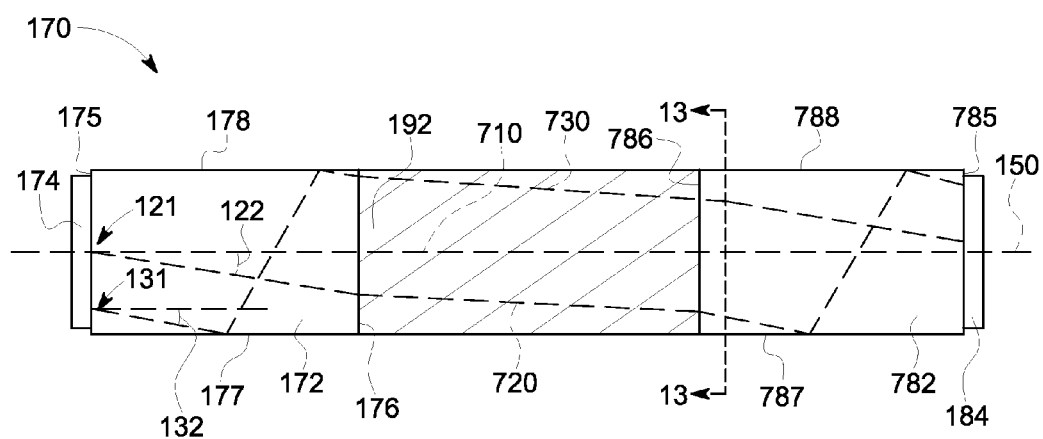
FIG. 14 illustrates a plurality of ultrasonic signal paths traveling from the first ultrasonic buffer to the fifth ultrasonic buffer.

FIG. 14 illustrates a plurality of ultrasonic signal paths 710, 720, 730 traveling from the first ultrasonic buffer 172 (FIG. 2) to the fifth ultrasonic buffer 782 of FIG. 13. The ultrasonic signal is transmitted from the first transducer 174 via the first ultrasonic buffer 172 to the second transducer 184 via the fifth ultrasonic buffer 782. A portion of the ultrasonic signal is transmitted along a first (main) ultrasonic signal path 710, which is co-axial with axis 150 of FIG. 1. This first ultrasonic signal path 710 is a straight and direct path from the first ultrasonic buffer 172 (FIG. 2) to the fifth ultrasonic buffer 782. As a result of beam spread of the ultrasonic signal, other angular components of the ultrasonic signal travel along many other ultrasonic signal paths in addition to the first ultrasonic signal path 710. For example, a portion of the ultrasonic signal also travels along a second ultrasonic signal path 720 and a third ultrasonic path 730.

The second ultrasonic signal path 720 is initially directed at a 10 degree angle 122 from a center location 121 along the back wall 175 of the first ultrasonic buffer 172. The second ultrasonic signal path 720 changes direction at the face 176 of the first ultrasonic buffer 172, where it refracts into the fluid 192. The second ultrasonic signal path 720 changes direction at the face 786 of the fifth ultrasonic buffer 782 where it refracts from the fluid 192 into the fifth ultrasonic buffer 782. The second ultrasonic signal path 720 changes direction again when it reflects off the lower wall 787 of the fifth ultrasonic buffer 782. The second ultrasonic signal path 720 changes direction again when it reflects off the upper wall 788 of the fifth ultrasonic buffer 782. The second ultrasonic signal path 720 exits the fifth ultrasonic buffer 782 along the back wall 785 of the fifth ultrasonic buffer 782 and is received by the second ultrasonic transducer 184. As shown, the second ultrasonic signal path 720 is longer than the first ultrasonic signal path 710.

The third ultrasonic signal path 730 is initially directed at a 10 degree angle 132 from a non-center location 131 along the back wall 175 of the first ultrasonic buffer 172. The third ultrasonic signal path 730 changes direction when it reflects off the lower wall 177 of the first ultrasonic buffer 172. The third ultrasonic signal path 730 changes direction and reflects off an upper wall 178 of the first ultrasonic buffer 172. Next, the third ultrasonic signal path 730 changes direction at the face 176 of the first ultrasonic buffer 172, where it refracts into the fluid 192. The third ultrasonic signal path 730 changes direction at the face 786 of the fifth ultrasonic buffer 782 where it refracts from the fluid 192 into the fifth ultrasonic buffer 782. The third ultrasonic signal path 730 exits the fifth ultrasonic buffer 782 along the back wall 785 of the fifth ultrasonic buffer 782 and is received by the second ultrasonic transducer 184. As shown, the third ultrasonic signal path 730 is longer than the first ultrasonic signal path 710, and is slightly shorter than the second ultrasonic signal path 720.

Figure 15:
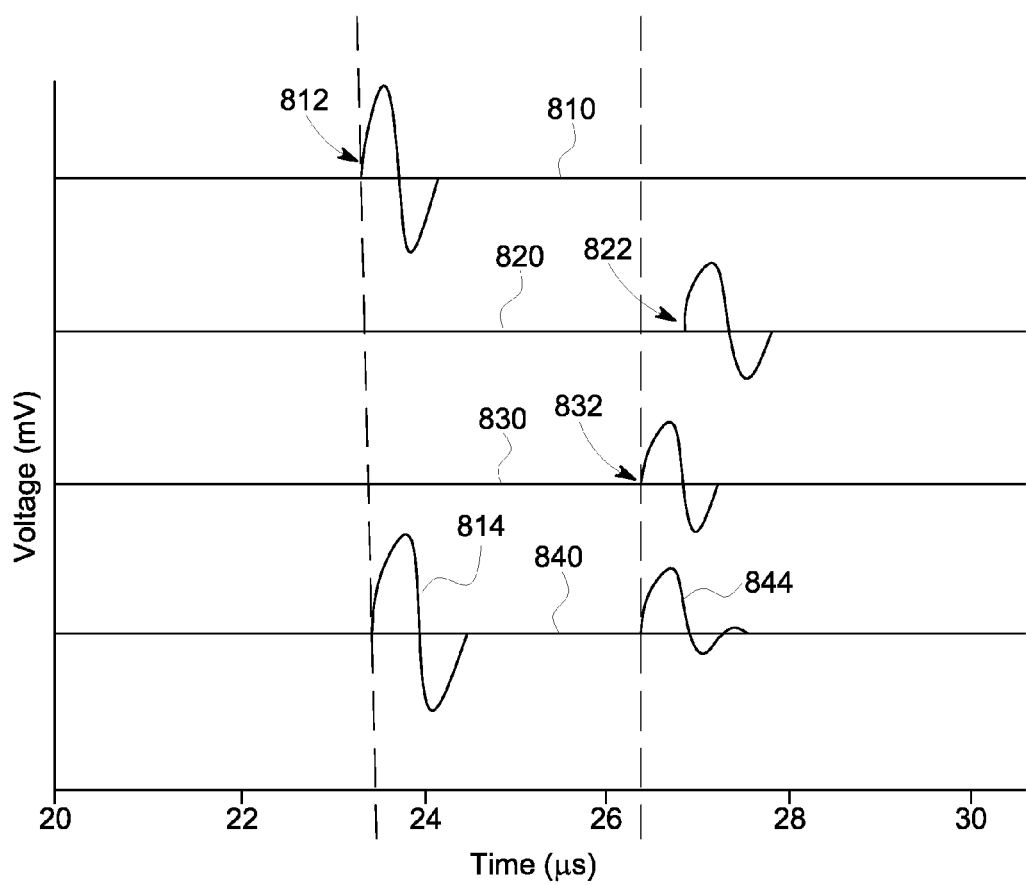
FIG. 15 illustrates a plurality of received ultrasonic signal waveforms corresponding to the ultrasonic signal as it is received by the second ultrasonic transducer via each of the ultrasonic signal paths of FIG. 14.

FIG. 15 illustrates a plurality of received ultrasonic signal waveforms 810, 820, 830 corresponding to the ultrasonic signal as it is received by the second transducer 184 via each of the ultrasonic signal paths 710, 720, 730 of FIG. 14. Each waveform 810, 820, 830 is a representative portion of the ultrasonic signal. As shown, the first ultrasonic signal waveform 810 is received via the first ultrasonic signal path 710, the second ultrasonic signal waveform 820 is received via the second ultrasonic signal path 720, and the third ultrasonic signal waveform 830 is received via the third ultrasonic signal path 730. The fourth (combined) ultrasonic signal waveform 840 is the combination of the ultrasonic signal paths 710, 720, 730.

Each of the ultrasonic signal waveforms 810, 820, 830, respectively includes a leading edge 812, 822, 832 that arrives at a particular time. In one exemplary ultrasonic flow measurement system (1 MHz ultrasonic signal, the first ultrasonic buffer 172 is made from Molybdenum and the fifth ultrasonic buffer 782 is made from SS316 stainless steel, each are 0.75 in. (19.05 mm) length, with 1.0 in. (25.4 mm) water separation between the ultrasonic buffers 172, 782), the leading edge 812 of the first ultrasonic signal waveform 710 is received by the second ultrasonic transducer 184 via the first ultrasonic signal path 710 at a time of 23.17 microseconds. The leading edge 822 of the second ultrasonic signal waveform 820 is received via the second ultrasonic signal path 720 at a time of 26.82 microseconds. The leading edge 832 of the third ultrasonic signal waveform 830 is received via the third ultrasonic signal path 730 at a time of 26.30 microseconds, different than the time of the leading edge 822 of the second ultrasonic signal waveform 820 because of the different cross-sections and materials of the ultrasonic buffers 172, 782.

The first portion 814 of the combined ultrasonic signal waveform 840 is the portion of the received ultrasonic signal contributed by the first ultrasonic signal waveform 810 received via the first ultrasonic signal path 710 from which the transit time should be determined. Since the second and third ultrasonic signal waveforms 820, 830 arrive at different times that are approximately one half cycle/period apart (0.5 microseconds for a 1 MHz signal), the destructive combination of these ultrasonic signal waveforms 820, 830 forms a second portion 844 of the combined ultrasonic signal waveform 840 that has a smaller amplitude than the first portion 814 of the combined ultrasonic signal waveform 840. Since the amplitude of the second portion 844 is smaller than the amplitude of the first portion 814 of the combined ultrasonic signal waveform 840, the signal processing electronics of the ultrasonic flow measurement system can more easily identify the first portion 814 of the combined ultrasonic signal waveform 840 from which the transit time of the ultrasonic signal is determined.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. For example, while the first section and second section of the cap are shown disposed substantially planar to the first planar surface of the substrate in the disclosed embodiments, it will be understood that the sections can be disposed at a different orientation (e.g., at a slope relative to the first planar surface of the substrate).

What is claimed is:

1. An ultrasonic flow measurement system comprising:
   a first ultrasonic sensor comprising a first ultrasonic transducer and a first ultrasonic buffer; and
   a second ultrasonic sensor comprising a second ultrasonic transducer and a second ultrasonic buffer, the second ultrasonic sensor aligned with the first ultrasonic sensor along an axis,
   wherein the first ultrasonic buffer has a first cross section that is perpendicular to the axis and the second ultrasonic buffer has a second cross section that is perpendicular to the axis,
   wherein the first cross section of the first ultrasonic buffer is different from the second cross section of the second ultrasonic buffer,
   wherein the first cross section of the first ultrasonic buffer has a first diameter and the second cross section of the second ultrasonic buffer has a second diameter, and wherein the first diameter is different from the second diameter.

2. The ultrasonic flow measurement system of claim 1, wherein the first cross section of the first ultrasonic buffer has a first shape and the second cross section of the second ultrasonic buffer has a second shape, and wherein the first shape is different from the second shape.

3. The ultrasonic flow measurement system of claim 1, wherein the first cross section of the first ultrasonic buffer has a circular shape and the second cross section of the second ultrasonic buffer has a first section having a circular shape and a second section having a straight edge.

4. The ultrasonic flow measurement system of claim 1, wherein the first diameter is larger than the second diameter.

5. The ultrasonic flow measurement system of claim 1, wherein the first ultrasonic buffer is constructed from a first material and the second ultrasonic buffer is constructed from a second material, and wherein the first material is different from the second material.

6. The ultrasonic flow measurement system of claim 5, wherein the first material is Molybdenum and the second material is stainless steel.

7. An ultrasonic flow measurement system comprising:
   a first ultrasonic sensor comprising a first ultrasonic transducer and a first ultrasonic buffer; and
   a second ultrasonic sensor comprising a second ultrasonic transducer and a second ultrasonic buffer, the second ultrasonic sensor aligned with the first ultrasonic sensor along an axis,
   wherein the first ultrasonic buffer has a first cross section that is perpendicular to the axis and the second ultrasonic buffer has a second cross section that is perpendicular to the axis,
   wherein the first cross section of the first ultrasonic buffer has a first shape and the second cross section of the second ultrasonic buffer has a second shape, and wherein the first shape is different from the second shape, and
   wherein the first cross section of the first ultrasonic buffer has a first diameter and the second cross section of the second ultrasonic buffer has a second diameter, and wherein the first diameter is different from the second diameter.

8. The ultrasonic flow measurement system of claim 7, wherein the first cross section of the first ultrasonic buffer has a circular shape and the second cross section of the second ultrasonic buffer has a first section having a circular shape and a second section having a straight edge.

9. An ultrasonic flow measurement system comprising:
   a first ultrasonic sensor comprising a first ultrasonic transducer and a first ultrasonic buffer; and
   a second ultrasonic sensor comprising a second ultrasonic transducer and a second ultrasonic buffer, the second ultrasonic sensor aligned with the first ultrasonic sensor along an axis,
   wherein the first ultrasonic buffer has a first cross section that is perpendicular to the axis and the second ultrasonic buffer has a second cross section that is perpendicular to the axis, and
   wherein the first cross section of the first ultrasonic buffer has a first diameter and the second cross section of the second ultrasonic buffer has a second diameter, and wherein the first diameter is different from the second diameter.

10. The ultrasonic flow measurement system of claim 9, wherein the first diameter is larger than the second diameter.

11. The ultrasonic flow measurement system of claim 9, wherein the first cross section of the first ultrasonic buffer has a circular shape and the second cross section of the second ultrasonic buffer has a first section having a circular shape and a second section having a straight edge.

* * * * *